Figure 1:
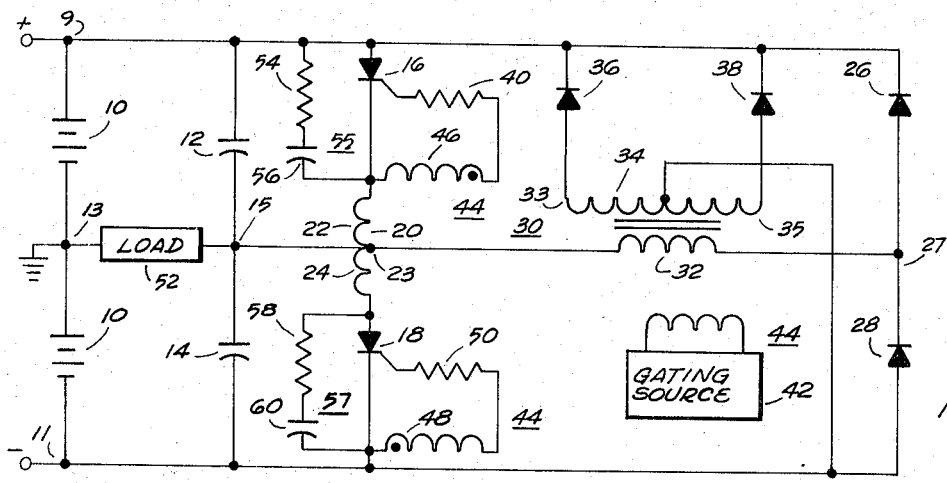

United States Patent Office 3,311,809
Patented Mar. 28, 1967

3,311,809
STATIC INVERTER COMMUTATION CIRCUIT
Philip D. Corey and Armistead L. Wellford, Waynesboro, Va., assignors to General Electric Company, a corporation of New York
Filed June 19, 1963, Ser. No. 288,955
6 Claims. (Cl. 321—45)

This invention relates to static inverters. More particularly, it relates to improved static inverters utilizing gate controlled rectifiers as the switching elements therein.

In heretofore known static inverters, an output transformer has had to be included to provide an alternating current output from the inverter which is balanced with respect to a system reference point. Such need for an output transformer has presented the disadvantage of the cost entailed therefor, the weight presented thereby in situations where weight is at a premium plus the other difficulties normally encountered with power handling transformers. Also, in known static inverters, the commutating capacitors utilized therein have had to have a capacitance value which, in addition to enabling them to carry peak load current, permit them to correct for lagging power factor loads, i.e., reactive loads. Where silicon controlled rectifiers have been utilized as the switching elements in such inverters, they have had to have ratings far in excess of the peak D.C. supply voltage to enable their handling high voltage transients and spikes. Also, in such known circuits, there have had to be included a large amount of circuit elements to insure voltage regulation, voltage transient suppression, etc.

One of the pressing problems presented by presently used inverters wherein the switching elements are gate controlled rectifiers is that all of the energy stored in the commutating capacitors which does not flow into the load during the commutation interval is dissipated as heat. This problem becomes particularly acute at higher frequencies. The heated circuit components such as gate controlled rectifiers, commutating reactors and the like are very difficult to cool and a great loss of efficiency is entailed.

It is, accordingly, an important object of this invention to provide a simple static inverter circuit utilizing gate controlled rectifiers as the switching elements therein wherein reliable commutation is accomplished.

It is a further object to provide a static inverter in accordance with the preceding object wherein the A.C. output therefrom is balanced to a system reference point thereby eliminating the need for an output transformer and whereby voltage regulation of the output may be simply achieved.

It is another object to provide a static inverter in accordance with the preceding objects wherein there is appreciably minimized the inherent loss of commutation energy, especially at higher output frequencies.

Generally speaking and in accordance with the invention, there is provided a circuit for converting the output of a unidirectional potential source having a positive and a negative terminal to an A.C. output comprising a series arrangement of first and second gate controlled rectifiers and a center-tapped inductance disposed therebetween connected across the source. A first commutating capacitance is connected across the first gate controlled rectifier and one half of the inductance and a second capacitance is connected across the second gate controlled rectifier and the other half of the inductance. A transformer is connected between the center of the inductance and the midpoint of pump back diodes coupled in series across the source. Means are included in circuit with the source and the transformer for substantially constraining the voltage across the transformer to the voltage of the source. Generating means are provided in circuit with the gate controlled rectifiers for gating them into conductivity during alternately occurring half cycles of the output from the generating means. A first forward poled "pumpbock" diode is included between the aforesaid midpoint and the positive terminal and a second forward poled "pumpback" diode is connected between the negative terminal and the midpoint.

The features of this invention which are believed to be new are set forth with particularity in the appended claims. The invention, itself, however, may best be understood by reference to the following description when taken in conjunction with the accompanying drawings which show embodiments of a static inverter according to the invention.

Figure 2:
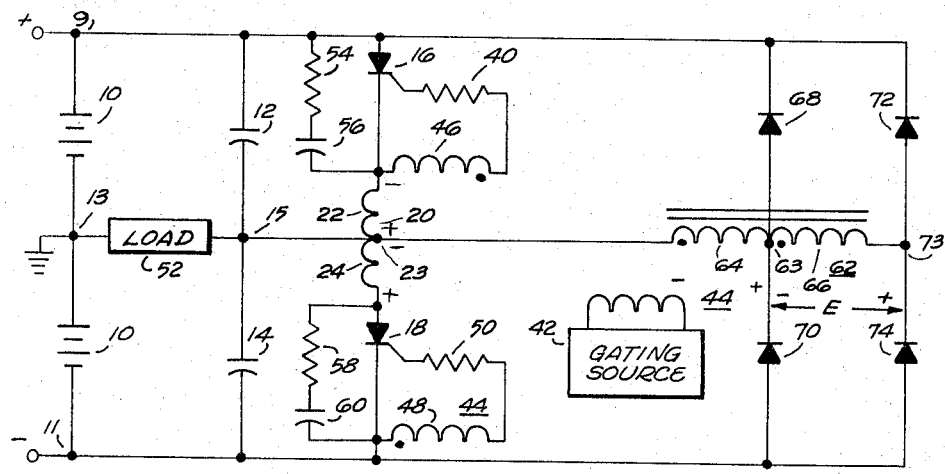
Figure 3:
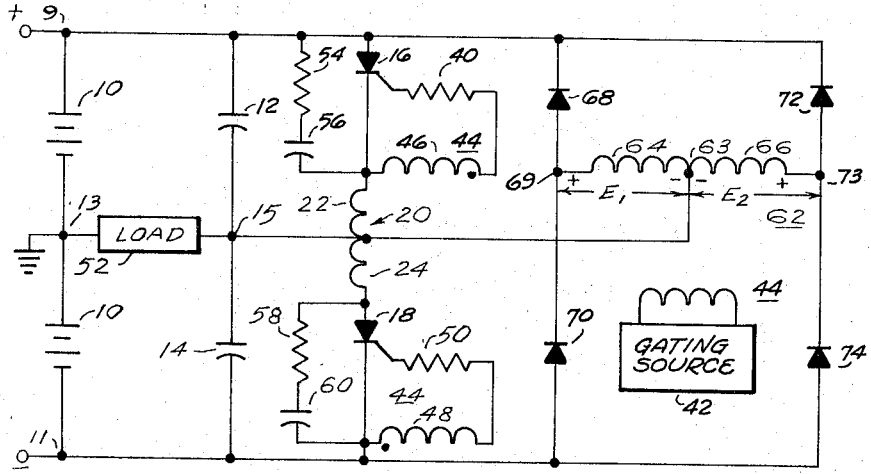

In the drawing, FIG. 1 is a schematic depiction of a first illustrative embodiment of a static inverter constructed in accordance with the principles of the invention; and FIGS. 2 and 3 are diagrams of further embodiments of a static inverter constructed in accordance with the invention.

Referring now to FIG. 1 wherein there is shown an illustrative embodiment of the static inverter constructed in accordance with the principles of the invention, there is shown connected across a unidirectional potential source 10 depicted as a battery and whose output is to be converted to an A.C. potential, the series arrangement of the anode to cathode path of a first silicon controlled rectifier 16, an inductor 20, and the anode to cathode path of a second silicon controlled rectifier 18. Also, connected across source 10 is the series arrangement of the pair of commutating capacitors 12 and 14. The midpoint 23 of inductor 20, and the junction 15 of capacitors 12 and 14 are interconnected.

Also, connected across source 10 is the series arrangement of the cathode to anode paths of diodes 26 and 28, their junction 27 being connected to midpoint 23 of inductor 20 through the primary winding 32 of a transformer 30, the secondary winding 34 of transformer 30 being center-tapped to the negative terminal 11 of source 10 and having its terminals 33 and 35 connected to the positive terminal 9 of source 10 through the anode to cathode paths of rectifier diodes 36 and 38.

Connected in the gate to cathode circuit of silicon controlled rectifier 16 is the series arrangement of a current limiting resistor 40 and a secondary winding 46 of a transformer 44 across which there is developed the output of a gating source 42, gating source 42 suitably being a rectangular wave multivibrator, or like rectangular wave generating circuit. Similarly, connected in the gate to cathode circuit of silicon controlled rectifier 18 is a current limiting resistor 50 and a secondary winding 48 of transformer 44. Windings 46 and 48 are oppositely poled whereby silicon controlled rectifiers 16 and 18 are gated alternately into conductivity by successive half cycles of output from gating source 42. The A.C. output of the circuit of FIG. 1 is developed across a load 52, connected as shown which may be resistive or reactive.

Connected across silicon controlled rectifier 16 is the series arrangement 55 of a resistor 54 and a capacitor 56 and connected across silicon controlled rectifier 18 is the series arrangement 57 of a resistor 58 and a capacitor 60. Series arrangements 55 and 57 are included in order to absorb any energy in the small leakage inductance of inductor 20 after silicon controlled rectifier reverse current has suddenly ceased to flow.

In considering the operation of the circuit of FIG. 1, let it be assumed that silicon controlled rectifier 16 is conducting whereby load current flows from positive terminal 9 through silicon controlled rectifier 16, the "upper" half 22 of inductor 20 and load 52. During the half cycle that silicon controlled rectifier 16 is conductive, side 15 of commutating capacitor 14 charges to the potential of positive terminal 9. At the end of this half cycle of operation, silicon controlled rectifier 18 is gated into conductivity and gating current is simultaneously removed from silicon controlled rectifier 16. At the instant that silicon controlled rectifier 18 is rendered conductive, the full voltage across capacitor 14 appears across the "lower" half 24 of inductor 20 thus forcing the voltage across this lower half to be instantaneously equal to the D.C. supply voltage. Because of autotransformer action between the upper and lower halves of center-tapped inductor 20, instantaneously, the voltage across the entire winding of inductor 20 will be equal to twice the D.C. supply voltage. Consequently, the anode to cathode voltage across silicon controlled rectifier 16 is reversed and silicon controlled rectifier 16 is commutated into nonconductivity.

Now, on the succeeding half cycle, i.e., when silicon controlled rectifier 16 is again gated into conductivity, capacitor 12 which charged to the potential of source 10 during the conductive half cycle of silicon controlled rectifier 18 discharges, a similar series of commutation events ensue, and silicon controlled rectifier 18 is commutated into nonconductivity. Of course, during the half cycle that silicon controlled rectifier 18, conducts, capacitor 14 becomes discharged and during the half cycle that silicon controlled rectifier 16 conducts capacitor 12 becomes discharged.

Diodes 26 and 28 enable the return of energy from the load circuit to the source which is necessary to enable the inverter to carry reactive loads, diodes 26 and 28 being so-called "pumpback" diodes. Capacitors 12 and 14 suitably have a like value, this value being chosen such that the capacitors can supply both the load current and commutating inductor 20 current for an interval long enough to permit a silicon controlled rectifier to gain its forward blocking ability when it is commutated into nonconductivity.

During the commutating interval, excess commutating current energy stored in capacitor 14 may also be returned to source 10 by the current path provided through the inductor half 24, silicon controlled rectifier 18, diode 28 and primary winding 32 and consequently need not be dissipated in the form of heat. Diode 26 and winding 32 function to permit the return of excess commutating energy stored in capacitor 12 when silicon controlled rectifier 16 is gated into conductivity. The voltage across center tapped secondary winding 34 is clamped to the voltage of source 10 by full wave rectifier diodes 36 and 38. The voltage across primary winding 32 is consequently substantially the source 10 voltage plus the forward voltage drop of a diode 36 or 38 multiplied by the ratio of one half the number of winding turns in secondary winding 34 to the number of winding turns in primary winding 32.

The reverse voltage appearing inductor 20 consequently is constrained such that this reverse voltage is restricted to the low forward voltage drop of a conducting silicon controlled rectifier, the forward voltage drop of one of diodes 26 or 28 plus the voltage drop across primary winding 32.

It is seen from the above that in accordance with the principles of the invention, there is presented a simple static inverter circuit. With this circuit, given silicon controlled rectifier turn-off time requirements and peak load current, optimum commutating inductor and capacitor values can be immediately computed. This circuit presents many further advantages as are detailed below.

(1) The main power handling magnetic device which is the linear commutating inductor 20 is non-saturating, and therefore, inherently acoustically quiet.

(2) The commutating capacitors need be sized proportionately only to carry the peak load current at the instant of commutation. Capacitance value need not be chosen to correct for the value of a reactive load and consequently the circuit of FIG. 1 is insensitive to load power factor.

(3) The "up-and-down" auto-commutation action of the circuit enables the elimination of an output power transformer since the circuit is balanced to the midpoint of the unidirectional potential supply. Consequently, the circuit may be conveniently and economically utilized in pulse-width modulated inverter applications as well as in situations where phasor addition connections are employed for voltage regulation.

(4) The peak instantaneous voltages across the silicon controlled rectifiers are strictly limited to the peak D.C. supply voltage plus the voltage across the primary winding 32 of transformer 30. Typically, the half of the secondary to the primary windings ratio in the transformer may be about 20 to 1. Thus, the silicon controlled rectifiers need only be rated to withstand peak voltages of approximately 10 percent greater value than the peak unidirectional supply voltage. Of course, such peak silicon controlled rectifier voltages are appreciably lower than in known efficient circuits.

(5) In many situations, the impedance of inductor 20 is sufficient to limit the reverse current in the silicon controlled rectifiers to safe levels without the need for other circuit components. Furthermore, resistors 54 and 58 and capacitors 56 and 60 respectively may be typically very small and inexpensive, and power dissipation in there is negligible.

(6) The commutating capacitors provide the dual function of load current commutation and additional filtering of the power supply. In this latter connection, the capacitors are connected across the supply and thus act as filter elements to help remove ripple and "spikes" from the D.C. supply.

In FIG. 2 wherein there is shown a second illustrative embodiment of the invention, the circuit is substantially similar to that of FIG. 1 except that transformer 30 therein has been replaced with an auto-transformer 62 comprising a primary winding 64 and a secondary winding 66, the junction 63 of pumpback diodes 68 and 70 also being the junction of windings 64 and 66. Diodes 72 and 74 for clamping the voltage on secondary winding 66 to the value of source 10, are connected across source 10 in series arrangement as shown, secondary winding 66 being connected to their junction 73.

In the operation of the circuit of FIG. 2 if it is assumed that silicon controlled rectifier 18 has been gated into conductivity by the next half cycle of output from gating source 42, and commutation has proceeded to the point where silicon controlled rectifier 16 has been rendered nonconductive, capacitor 14 is discharged, and the voltage across inductor reverses. This voltage across the lower half 24 of inductor 20 is equal to $$E_\text{D}+E_\text{R}+E\left(\frac{N_1}{N_2}\right) \quad (1)$$

wherein $E_\text{D}$ is equal to the forward voltage drop across diode 70, $E_\text{R}$ is equal to the forward voltage drop across silicon controlled rectifier 18 and wherein $$E\left(\frac{N_1}{N_2}\right)$$

is equal to the value of source 10 multiplied by the ratio of the number of winding turns, $N_1$, in primary winding 64 to the number of winding turns, $N_2$, in secondary winding 66, the voltage across secondary winding 66 being substantially equal to E (plus the negligible slight forward voltage drop across one of diodes 72 or 74). By autotransformer action, the voltage expressed by Equation 1 appears across the upper half 22 of inductor 20 whereby twice the voltage expressed by Equation 1 appears across inductor 20, and this voltage plus the total voltage of supply 10 is the peak forward voltage which must be withstood by silicon controlled rectifiers 16 and 18.

During this commutation interval whent he voltage across capacitor 14 is forced to appear across lower half 24 of inductor 20 and a resonant discharge takes place through inductor half 24, commutation current flows through silicon controlled rectifier 18, pumpback diode 70 and primary winding 64 and back to inductor half 24. Current also flows from junction point 63 through secondary winding 66 and diode 72 back to source 10. The voltage across secondary winding 66 is constrained to the value of the voltage supply 10 plus the forward voltage drop across diode 68 or 70 and diode 72 or 74 due to the clamping action of diodes 72 and 74. During this commutation of silicon controlled rectifier 16 into nonconducting, the polarities at the terminals of windings 64 and 66 are as shown in FIG. 2.

The peak forward voltage that a silicon controlled rectifier in the circuit of FIG. 2 need be able to withstand is in accordance with the equation:

$$PFV = E + 2\left(E_D + E_R + E \cdot \frac{N_1}{N_2}\right) - E_R$$

$$= E\left(1 + \frac{2N_1}{N_2}\right) + 2E_D + E_R \approx E\left(1 + 2\frac{N_1}{N_2}\right) \quad (2)$$

where the terms in the equation of FIG. 2 have the same significance as in Equation 1. Pumpback diodes 68 and 70 enable return of energy from load 52 to source 10 and provide a path for commutation current to circulate. Also, in conjunction with autotransformer 62 and rectifier diodes 72 and 74 which may be much smaller, diodes 68 and 70 function to clamp the forward voltage in a silicon controlled rectifier and provide a rectification path whereby surplus commutation energy is withdrawn from commutating inductor 20 and returned to source 10. Thus, diodes 68 and 70 function (1) to enable return of energy from the load circuit to the supply when the load is of the reactive type, (2) to clamp the peak forward voltage across the silicon controlled rectifier and (3) to return the surplus commutation energy to the D.C. source.

The circuit of FIG. 3 is substantially similar to that of FIG. 2 except that the midpoint 23 of inductor 20 is connected to the junction 63 of primary winding 64 and secondary winding 66 and the junction 69 of pumpback diodes 68 and 70 is connected to primary winding 64. In the operation of the circuit of FIG. 3, let it be assumed that silicon controlled rectifier 18 has been gated into conductivity by the output of gating source 42. In this situation, when the voltage across inductor 20 reverses during the resonant discharge, the voltage across the lower half 24 of inductor 20 is equal to $$E_R + E_D + \frac{E}{\frac{N_2}{N_1} - 1} \quad (3)$$

The voltage across secondary winding 66

$$E_2 = \frac{E}{1 - \frac{N_1}{N_2}} \quad (4)$$

and the voltage, $E_1$, across primary winding 64 is equal to $$\frac{E}{\frac{N_2}{N_1} - 1} \quad (5)$$

The voltage between junction point 69 and junction joint 73 is equal to E.

When silicon controlled rectifier 18 is gated into conductivity, commutating current flows through pumpback diode 70, transformer 62 and diode 72 to source 10. In this circuit, as in the circuit of FIG. 2, diodes 68 and 70 together with rectifier diodes 72 and 74 serve to clamp the voltage across transformer 62 to the potential of source E. The peak forward voltage that a silicon controlled rectifier in the circuit of FIG. 3 need withstand is in accordance with the equation:

$$PFV = E\left(1 + \frac{2}{\frac{N_2}{N_1} - 1}\right) + 2E_D + E_R \approx E\left(1 + 2\frac{N_1}{N_2}\right) \quad (6)$$

which is substantially the same as the peak forward voltage which need be withstood by the silicon controlled rectifiers of the circuit of FIG. 2. Thus, if the ratio between the secondary to primary winding turns in transformer 62 is chosen to be quite great, then the silicon controlled rectifiers in circuits of FIGS. 2 and 3 need be chosen to withstand a voltage only slightly in excess of the value of voltage from supply 10.

While there have been shown particular embodiments of this invention, it will, of course, be understood that it is not intended to be limited thereto since many modifications both in the circuit arrangements and the instrumentalities employed therein may be made and it is, therefore, contemplated by the appended claims to cover any such modifications as fall within the true spirit and scope of the invention.

What is claimed as new and desired to be secured by Letters Patent of the United States is:

1. A circuit for converting the output of a unidirectional potential source having a positive and a negative terminal to an A.C. output comprising a series arrangement of first and second gate controlled rectifiers and a center tapped inductance disposed therebetween connected across said source, a first capacitance connected across said first gate controlled rectifier and half of said inductance, a second capacitance connected across said second gate controlled rectifier and the other half of said inductance, an autotransformer having a primary and a secondary winding coupled in series and having a first end terminal, a second end terminal, and a common terminal, means coupling said first terminal to the center tap of said inductance, a first forward poled diode connected between said common terminal of said primary and secondary windings and said positive terminal, a second forward poled diode connected between said negative terminal and said common terminal of said primary and secondary windings, a third forward poled diode connected between said second terminal and said positive terminal, a fourth forward poled diode connected between said negative terminal and said second terminal and signal generating means in circuit with said gate controlled rectifiers for gating said controlled rectifiers into conductivity during alternately occurring half cycles of output from said generating means.

2. A circuit as defined in claim 1 wherein the ratio of the number of winding turns in said secondary winding to the number of winding turns in said primary winding is greater than unity.

3. A circuit as defined in claim 2 and further including first and second series arrangements of a capacitor and a resistor connected across said first and second gate controlled rectifiers respectively.

4. A circuit for converting the output of a unidirectional potential source having a positive and a negative terminal to an A.C. output comprising a series arrangement of first and second gate controlled rectifiers and a center-tapped inductance disposed therebetween connected across said source, a first capacitance connected across said first gate controlled rectifier and half of said inductance, a second capacitance connected across said second gate controlled rectifier and the other half of said inductance, an autotransformer comprising the series connection of a primary winding and a secondary winding, and having a first end terminal, a second end terminal, and a common terminal, the common terminal being connected to said inductance center, a first forward poled diode connected between said first terminal and said positive terminal, a second forward poled diode connected between said negative terminal and said first terminal, a third forward poled diode connected between said second terminal and said positive terminal, a fourth forward poled diode connected between said negative terminal and said second terminal, and generating means in circuit with said gate controlled rectifiers for gating said controlled rectifiers into conductivity during alternately occurring half cycles of output from said generating means.

5. A circuit as defined in claim 4 and further including first and second series arrangements of a capacitor and a resistor connected across said first and second controlled rectifiers respectively.

6. A circuit as defined in claim 5 wherein the ratio of the number of turns in said secondary winding to the number of turns in said primary winding exceeds unity.

References Cited by the Examiner

UNITED STATES PATENTS

| | | | |
|---|---|---|---|
| 3,120,633 | 2/1964 | Genuit | 321—45 |
| 3,120,634 | 2/1964 | Genuit | 321—45 |
| 3,131,343 | 4/1964 | Reinert | 321—45 X |

OTHER REFERENCES

Semiconductor Products: March 1960, "Solid State Power Inversion Techniques," pp. 51–56, page 55.

JOHN F. COUCH, *Primary Examiner.*

W. H. BEHA, *Assistant Examiner.*